April 9, 1963 — M. L. ALSPAUGH — 3,084,471
FLOATING ANTI-FOULING SINKER AND CHUM DISPENSER
Filed July 28, 1961
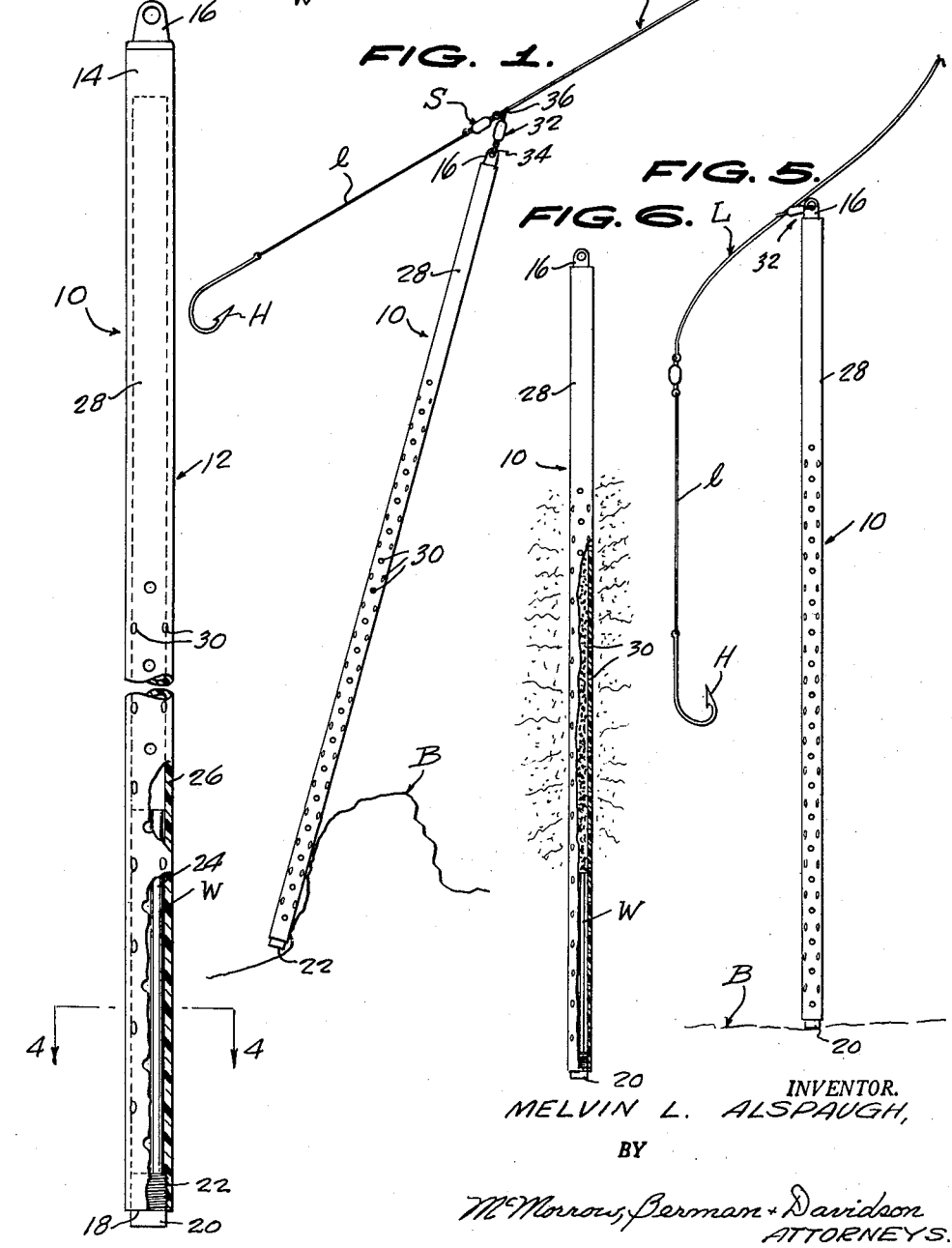
INVENTOR.
MELVIN L. ALSPAUGH,
BY
McMorrow, Berman & Davidson
ATTORNEYS.

United States Patent Office 3,084,471
Patented Apr. 9, 1963

3,084,471
FLOATING ANTI-FOULING SINKER AND CHUM DISPENSER
Melvin L. Alspaugh, 19210 NW. 10th Court, North Miami, Fla.
Filed July 28, 1961, Ser. No. 127,684
5 Claims. (Cl. 43—44.99)

This invention relates to a novel combination floating anti-fouling sinker and chum dispenser, especially but not exclusively, for still and drift fishing.

The primary object of the invention is the provision of a simple, efficient, and highly practical device of the kind indicated, which eliminates hanging and snagging in rocks and other underwater obstructions, thereby preventing the substantial losses of tackle, including hooks and sinkers, which are ordinarily incidental to still and drift fishing, and which desirably regulates clearance of bait above the bottom.

Another object of the invention is the provision of a device of the character indicated above which is adapted to be slidably connected to a fishing line, above a stop on the line, such as a swivel connecting a hook-equipped leader thereto, whereby the line is free to be payed out and taken in, relative to the device, as where a hooked fish makes a run, either toward or away from the boat, so that unwanted slack in the line is eliminated and a tight line is easily maintained.

A further object of the invention is the provision of a device of the character indicated above which involves a hollow vertically elongated tube, having a closed upper end to which a swivel is adapted to be secured, an open lower end which is closed by a removable plug, removable weight means in the lower part of the tube, retained by the plug, and a sidewall having an imperforate upper portion and a perforated lower portion, the upper sidewall portion defining a trapped air flotation chamber, and the lower sidewall portion and the weight means, together with the water entering the tube thereat, constituting erecting, stabilizing, and depth control means for the device, the plug and the weight means being removable for the purpose of admitting the placing of chum within the tube, when desired.

Other important objects and advantageous features of the invention will be apparent from the following description and the accompanying drawings, wherein, for purposes of illustration only, a specific form of the invention is set forth in detail.

In the drawings:

FIGURE 1 is a schematic side elevation showing a device of the invention installed on a fishing line and bearing harmlessly at its lower end against a bottom obstruction, and bearing at its upper end against a stop on the line, spaced from the line's hook;

FIGURE 2 is an enlarged and vertically contracted side elevation of the device, portions being broken away and in section;

FIGURE 3 is a top plan view of FIGURE 2;

FIGURE 4 is a horizontal section taken on the line 4—4 of FIGURE 1;

FIGURE 5 is a view like FIGURE 1, showing the lower end of the device bearing upon the bottom and the line moved relative to the device, away from the fisherman; and FIGURE 6 is a side elevation of the device, on the scale of FIGURE 1, partly broken away and in section, and showing chum present in the device and dispensing therefrom.

Referring in detail to the drawings, wherein like numerals designate like parts throughout the several views, the illustrated device, generally designated 10, is shown installed on a fishing line L, relative to a stop thereon, such as a swivel S connecting a leader l to the line, the leader having a hook H on its end remote from the swivel S.

The device 10 comprises a vertically elongated tubular body 12, of such as plastic or non-corrosive light weight metal, having a closed upper end 14, on which is fixed an upstanding transverse eye 16. The body 12 has an open lower end 18, which is normally closed by a removable plug 20, which is preferably threaded into the body, as indicated at 22. The plug 20 serves to retain in place a suitable weight W, such as a plurality of metal rods 24, which while preferably frictionally confined in the body 12, in the lower part thereof, are removable, upon removal of the plug 20. As indicated in FIGURES 2 and 6, the weight occupies only a limited part of the length of the body 12, and the remainder of the interior of the body is unoccupied, except for air and water when the device is in use.

The body 12 has a preferably uniformly cylindrical side wall 26, and approximately the upper fourth of the sidewall is imperforate, as indicated at 28, to provide a trapped air flotation chamber, which serves not only to maintain the device in an erect position in water, but, in conjunction with the weight, to determine the buoyancy of the device in water, and the depth to which it will subside or sink in water. Thus, by changing weights, the stability of the device in water can be predetermined, as well as the depth to which it will sink.

The body sidewall 26 is formed with preferably uniformly distributed perforations 30, which extend downwardly from the imperforate upper portion 28 to the lower end of the body, so as to provide for admission of water into the body 12, which then serves both to trap air in the flotation chamber, and augment the weight W in stabilizing the device in the water.

As shown in the drawings, a swivel 32 is preferably employed to connect the device 10 to a fishing line L, one eye 34 of the swivel 32 being engaged through the eye 14 on the upper end of the device, and the other eye 36 of the swivel 32 being engaged over the line L, inwardly of the line swivel S, whereby the device is free to slide toward and away from the line swivel S, or, otherwise stated, the line L is free to be payed out, relative to the device 10, and to be taken in relative to the device 10, to the limit provided by the line swivel S, as indicated in FIGURES 5 and 6, respectively. In the paying out of the line L relative to the device 10, the device remains upright, as shown in FIGURE 5, and the device remains upright when the line L is taken in, until the line swivel S or stop engages the swivel 32 of the device, as shown in FIGURE 6, whereat the device, with or without a fish impaled on the leader hook H, can be pulled into the boat. It will also be seen that the foregoing arrangements enable a fisherman to visually determine the height of the hook H, and bait thereon (not shown), above the bottom B, for both high level and bottom fishing.

The device 10 can be used as a chum dispenser, along with its above outlined functions, simply by removing the plug and the weight, and introducing chum into the interior of the body 12, to partially or wholly fill the space between the flotation chamber and the weight W, and replacing the weight W and the plug 20, so that, as indicated in FIGURE 6, particles of chum C and oils emanating therefrom, escape into the water through the sidewall perforations 30 for attracting fish.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A device of the character described comprising a vertically elongated tubular body of small uniform diameter relative to its length having a closed upper end and an open lower end, an upstanding eye on said upper end, a removable plug engaged in the lower end of the body, a removable weight in the lower part of the body and retained by said plug, said body having a sidewall having an imperforate upper portion defining an air trapping flotation chamber, the part of the body sidewall below said flotation chamber being formed with perforations.

2. A device of the character described comprising a vertically elongated tubular body of small uniform diameter relative to its length having a closed upper end and an open lower end, an upstanding eye on said upper end, a removable plug engaged in the lower end of the body, a removable weight in the lower part of the body and retained by said plug, said body having a sidewall having an imperforate upper portion defining an air trapping flotation chamber, the part of the body sidewall below said flotation chamber being formed with perforations, said perforations extending to the lower end of the body.

3. A device of the character described comprising a vertically elongated tubular body of small uniform diameter relative to its length having a closed upper end and an open lower end, an upstanding eye on said upper end, a removable plug engaged in the lower end of the body, a removable weight in the lower part of the body and retained by said plug, said body having a sidewall having an imperforate upper portion defining an air trapping flotation chamber, said weight comprising a plurality of vertically elongated rods arranged in side-by-side relationship.

4. A device of the character described comprising a vertically elongated tubular body of small uniform diameter relative to its length having a closed upper end and an open lower end, an upstanding eye on said upper end, a removable plug engaged in the lower end of the body, a removable weight in the lower part of the body and retained by said plug, said body having a sidewall having an imperforate upper portion defining an a itrapping flotation chamber, the part of the body sidewall below said flotation chamber being formed with perforations, in combination with a fishing line terminating in a stop from which a fishhook equipped leader extends, the eye of the device being slidably engaged on the line on the side of the stop opposite said fishhook.

5. A device of the character described consisting of a normally vertically disposed and elongated tubular rod, said rod being of uniform diameter throughout its length and having a small diameter compared to its length, said rod having a sidewall, a lower end, a closed upper end having fishing line connecting means thereon, a weight within the lower part of the rod, means closing the lower end of the rod, a major portion of the length of the rod from its lower end being perforated, and a minor portion of the length of the rod sidewall from the upper end of the rod being imperforate to provide a buoyant air chamber within the upper end of the rod.

References Cited in the file of this patent

UNITED STATES PATENTS

| | | |
|---|---|---|
| 1,673,978 | Guindon | June 19, 1928 |
| 1,961,539 | White | June 5, 1934 |
| 2,033,701 | Gibbs | Mar. 10, 1936 |
| 2,605,576 | Young et al. | Aug. 5, 1952 |
| 2,614,358 | Adams | Oct. 21, 1952 |
| 2,729,912 | Moffett | Jan. 10, 1956 |
| 2,906,055 | Pizzani | Sept. 29, 1959 |
| 2,928,202 | Smerke | Mar. 15, 1960 |
| 2,941,327 | Rundell | June 21, 1960 |
| 2,979,853 | Erickson | Apr. 18, 1961 |
| 2,985,981 | King | May 30, 1961 |